United States Patent [19]

Perrault et al.

[11] 4,013,253

[45] Mar. 22, 1977

[54] BRACKET SUPPORT

[76] Inventors: Frederick Perrault, 2644 W. 225th St., Torrance, Calif. 90505;
Raymond E. Perrault, 2404 Colt Road, Rancho Palos Verdes, Calif. 90274

[22] Filed: Nov. 19, 1975

[21] Appl. No.: 633,421

[52] U.S. Cl. .................... 248/223.3; 248/243; 248/248
[51] Int. Cl.² .................................. A47F 5/00
[58] Field of Search .......... 248/223, 224, 225, 243, 248/245, 246, 247, 248, 121, 125, 56, 59, 73; 108/108; 211/103, 208

[56] References Cited

UNITED STATES PATENTS

| 459,844 | 9/1891 | Thomas | 248/223 |
|---|---|---|---|
| 573,985 | 12/1896 | Kunz | 248/223 |
| 2,997,269 | 8/1961 | Urbain et al. | 248/245 |
| 3,367,286 | 2/1968 | Jantzen | 248/223 |
| 3,575,299 | 4/1971 | O'Dette | 248/243 |

FOREIGN PATENTS OR APPLICATIONS

| 566,891 | 1/1945 | United Kingdom | 248/247 |

Primary Examiner—Robert A. Hafer
Attorney, Agent, or Firm—Gausewitz, Carr & Rothenberg

[57] ABSTRACT

This invention provides a bracket supporting arrangement in which an elongated member has sets of opposed tabs projecting from a flat surface, the upper tab in each set including a rib and a bendable end portion, the member being adapted to support a bracket having a normally vertical portion with upper and lower edges, and an opening intermediate the edges, with side flanges adapted to overlap the side flanges of the channel in providing stability to the bracket.

17 Claims, 8 Drawing Figures

U.S. Patent    Mar. 22, 1977    Sheet 1 of 2    4,013,253
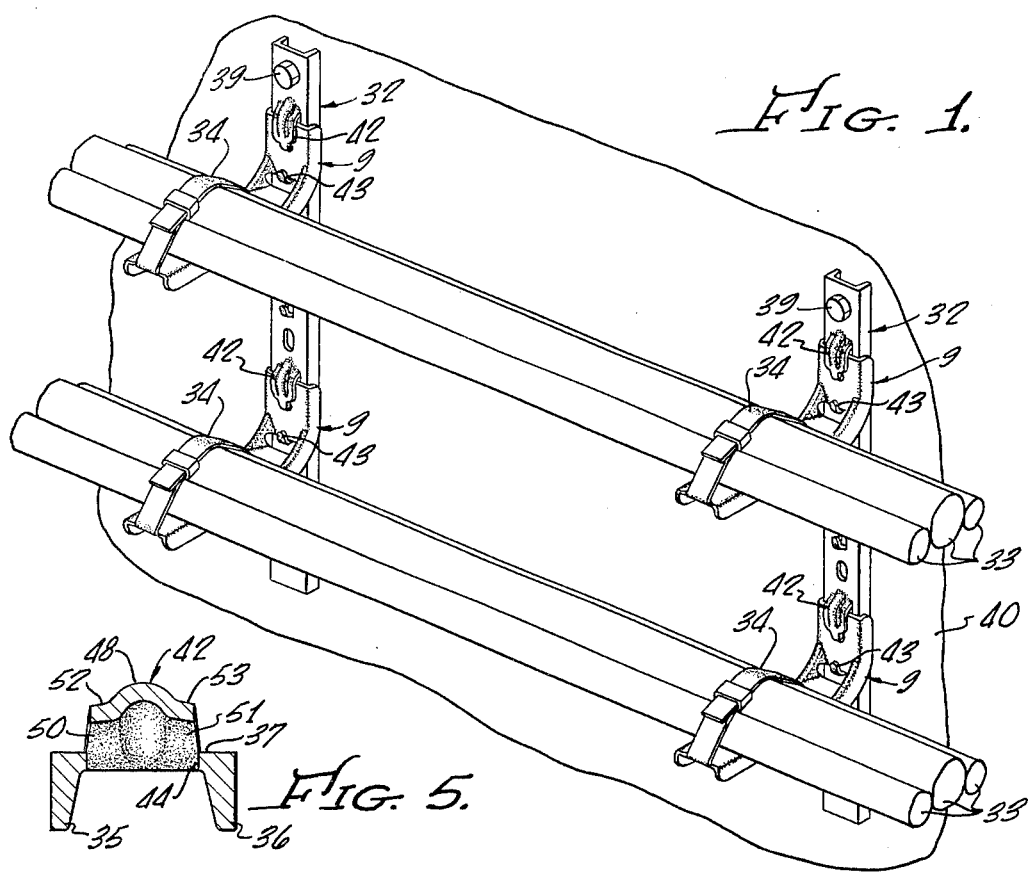
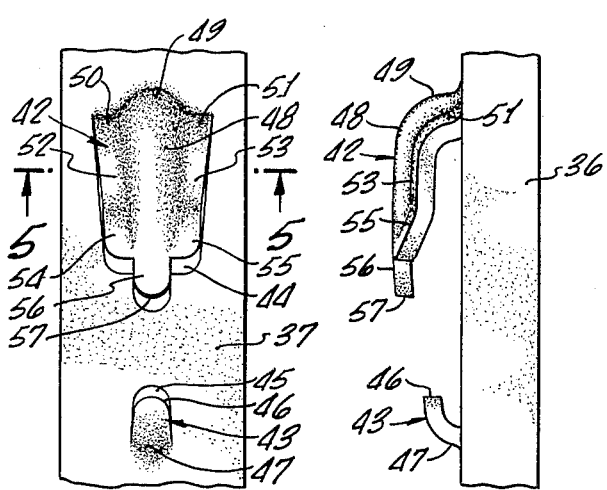
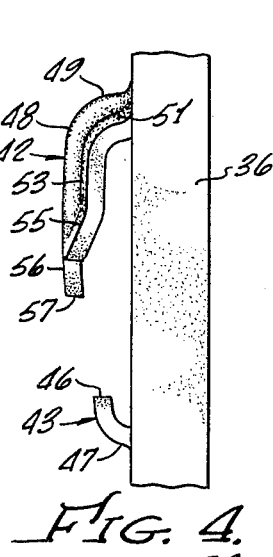
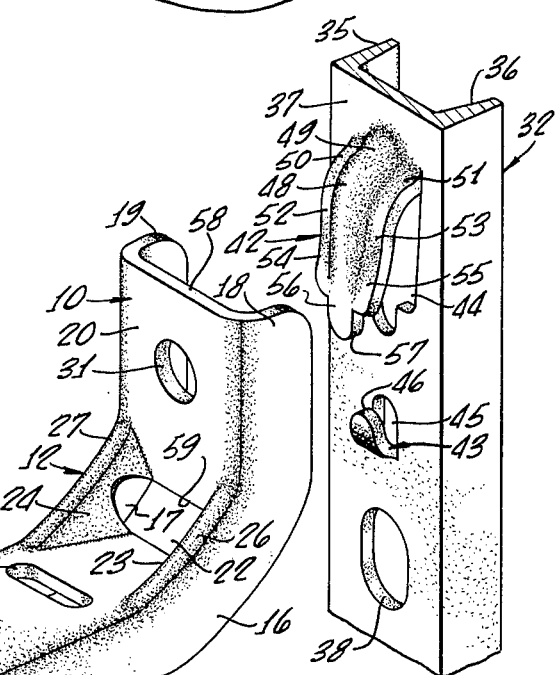
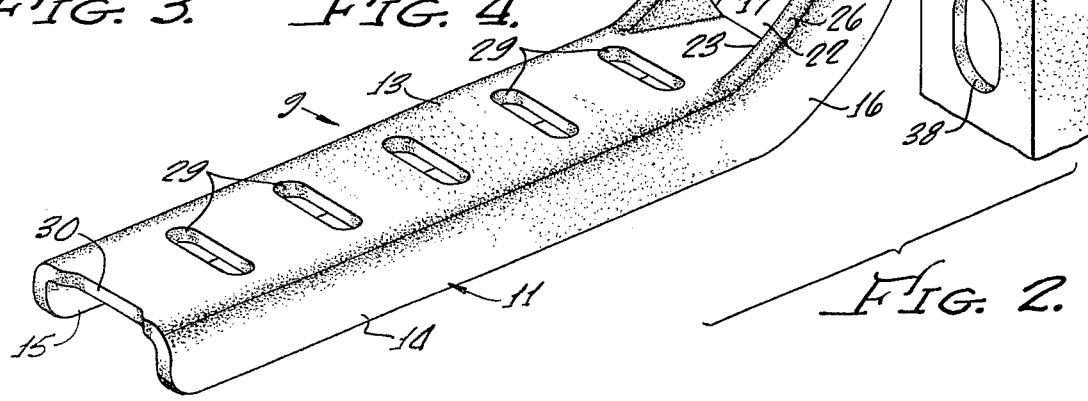

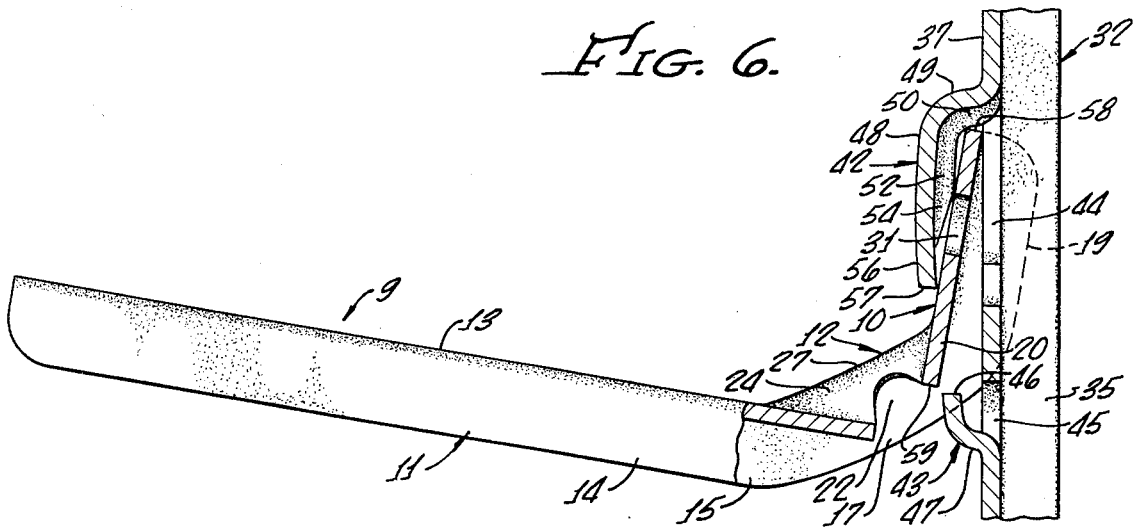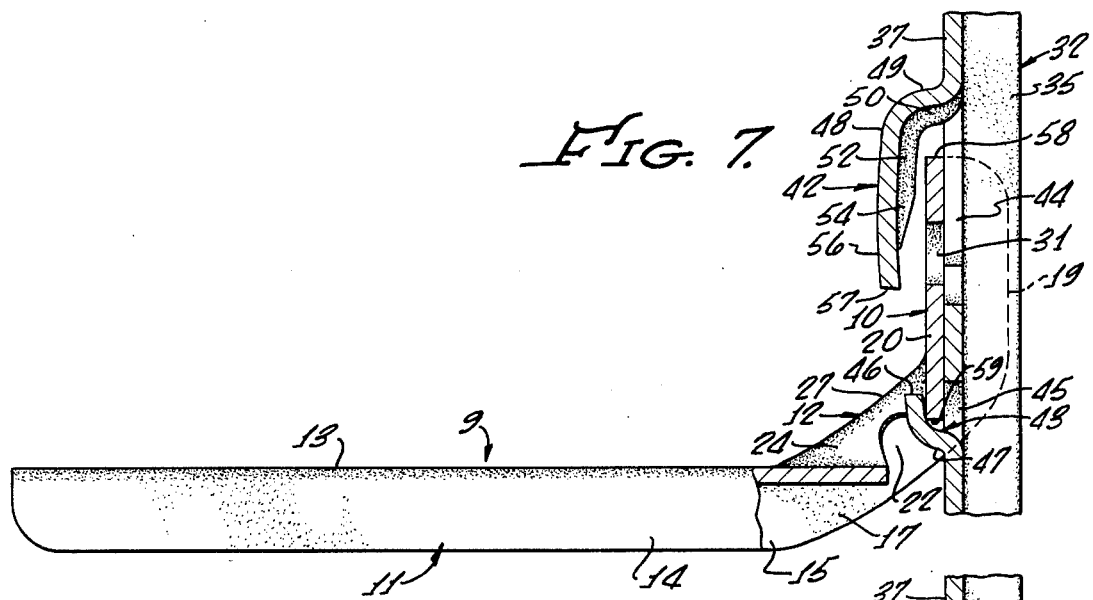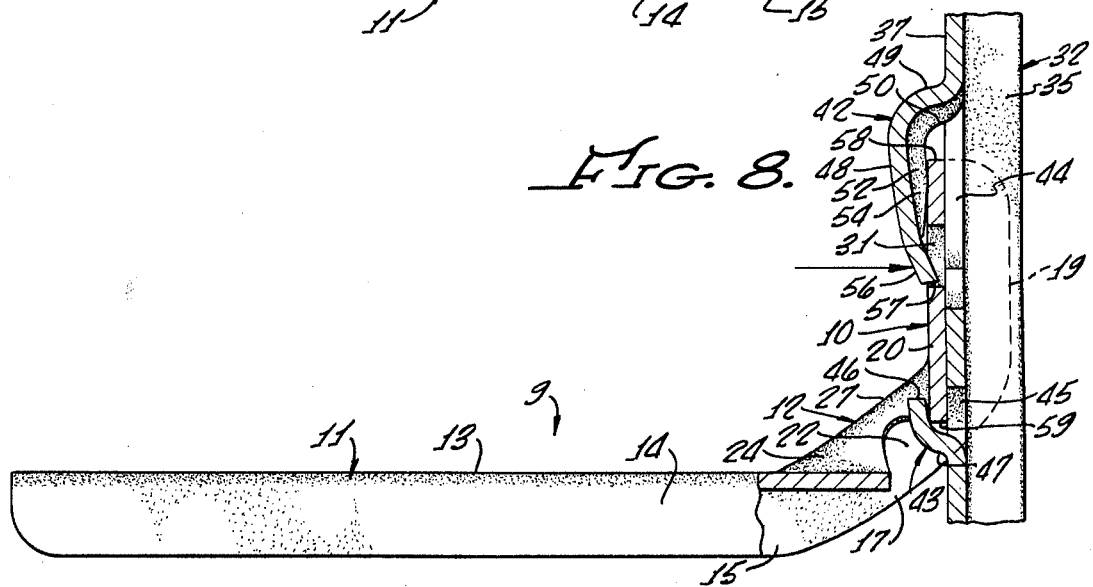

BRACKET SUPPORT

BACKGROUND OF THE INVENTION

1. Field of the Invention

This invention relates to a supporting device.

2. Description of the Prior Art

In supporting electrical cables in the electrical systems of ships, in underground electrical lines, underground telephone lines, and the like, it is customary to provide brackets attached to supports, with the cables resting on the brackets. These bracket and support assemblies have left much to be desired in that they are ordinarily relatively expensive to manufacture and install, may be awkward and difficult to use in supporting the cables and may be vulnerable to failure from the loads encountered, both static and dynamic. It may be necessary to have access to the area in back of the support when the attachment is made, which means that a clearance must be provided. This adds to the overall size of the support and bracket assembly, which is especially undesirable in underground installations and other places where space is limited.

A major improvement is represented by our earlier invention set forth in U.S. Pat. No. 3,923,277, which provides a cantilevered bracket of much greater load resistance than earlier designs. Attachment of the bracket to a support, such as a square tube, is accomplished by extending a bolt or other fastener through an opening in the vertical portion of the bracket, after which the threading of a nut onto the bolt or stud completes the attachment.

Although the advantages of this bracket are significant, it nevertheless requires the time-consuming operation of threading the nut onto the bolt or stud in accomplishing the attachment of the bracket to its support. The existence of a threaded connection inevitably raises the possibility of loosening from vibrational loads. The bolt or stud, with its associated nut and washer, represents a substantial expense in a system that utilizes a multiplicity of the brackets. Some past designs have done away with a separate fastener for the bracket, but these have lacked strength and reliability, and in some cases are relatively complex and hard to use. Hence, there has been a need for a bracket support which is strong and thoroughly reliable, yet which is more economical to manufacture and use than those heretofore available.

SUMMARY OF THE INVENTION

The present invention overcomes the objections of prior devices noted above, providing a bracket support that requires no separate attaching medium such as a bolt or stud. It is particularly adapted for use in supporting the bracket of the aforementioned U.S. Pat. No. 3,923,277. The support may be in the form of an elongated channel, with sets of opposed tabs, integral with the central web, projecting outwardly from the web in a direction opposite from the side flanges of the channel. Openings are formed in the web intermediate the sets of tabs for receiving fasteners for attaching the channel to a bulkhead, wall or other supporting structure.

The lower tab is relatively narrow and includes a part which is generally parallel to the central web of the channel, although slightly divergent upwardly. The upper tab is wider, extending outwardly to a portion that is generally parallel to the central web of the channel. The upper tab is transversely curved so as to be convex from the exterior, thereby giving it the configuration of a rib which enhances its rigidity and strength. It includes a narrower distal end portion beyond the rib which is relatively more bendable.

The bracket is associated with the support by placing its upper portion beneath the upper tab and then sliding the lower edge of the vertical portion behind the lower tab. The installation is completed merely by striking the upper tab with a hammer so as to bend the distal end portion of the upper tab into the opening of the bracket. The lower tab then holds the bracket against downward movement and the distal end of the upper tab prevents upward movement of the bracket. The major load on the bracket is a torque load which biases the upper end of the vertical portion away from the support. This force is resisted by the strong ribbed upper tab which securely holds the bracket to the support.

Thus, the attachment is complete without the use of any threaded connections and is accomplished very rapidly merely by moving the bracket into position and striking the upper tab with a hammer. The connection is strong and resistant to any loads which will be transmitted to the bracket during service. There is no need for clearance behind the support so that the assembly is very compact.

BRIEF DESCRIPTION OF THE DRAWINGS

FIG. 1 is a perspective view illustrating the assembled supporting device of this invention;

FIG. 2 is an enlarged fragmentary perspective view of the support and a bracket;

FIG. 3 is a fragmentary front elevational view of the support;

FIG. 4 is a fragmentary side elevational view of the support;

FIG. 5 is a transverse sectional view taken along line 5—5 of FIG. 3; and

FIGS. 6, 7 and 8 are sectional views partially in elevation showing the sequence of steps in attaching the bracket to the support.

DESCRIPTION OF THE PREFERRED EMBODIMENT

The bracket 9 illustrated, which is covered in the aforementioned U.S. Pat. No. 3,923,277, is a one piece member generally L-shaped in side elevation. The bracket 9 includes a relatively short vertical portion 10 and a longer horizontal portion 11, between which is an interconnecting portion 12. The horizontal portion 11 includes a flat upper surface 13 with depending flanges 14 and 15 along its side edges and at right angles to it. Flanges 16 and 17 of the interconnecting portion 12 extend at 45° angles from the inner ends of the flanges 14 and 15 and form continuations of them. The vertical section 10 of the bracket 9 includes side flanges 18 and 19 which connect to the inclined flanges 16 and 17, as well as a flat, intermediate portion 20 from which the side flanges extend at right angles.

At the interconnecting portion 12, a transversely elongated opening 22 is formed between the flat portion 13 of the horizontal section 11 and the flat portion 20 of the vertical section 10. In this area the bracket includes webs 23 and 24 which are on the inside and spaced from the flanges 16 and 17. The webs 23 and 24 incline toward each other from rounded upper surfaces 26 and 27 where they connect to the side flanges 16 and 17. The webs 23 and 24 interconnect the surfaces 13 and 20 and so are generally triangular in shape but interrupted at their lower ends by the corners of the transverse opening 22. By this construction, the side flanges 16 and 17 cooperate with the webs 23 and 24 to form stiffening ribs which interconnect the horizontal portion 11 and vertical portion 10 of the bracket 9.

Spaced transverse slots 29 extend through the upper wall 13 of the horizontal section 11 of the bracket. At the outer end of the horizontal portion 11 of the bracket, there is a shallow central recess 30 which is approximately the same dimension transversely of the bracket as that of the slots 29.

A circular opening 31 in the intermediate portion 20 of the vertical part 10 of the bracket 9 may receive a separate fastener in mounting the bracket on a supporting structure. However, when the bracket 9 is used in the manner discussed below, no such fastener is needed.

A number of the brackets 9 may be associated with downcomers 32, where they are used to support electrical cables 33 or other objects, as indicated in FIG. 1. Straps 34 extend around the cables 33 and the brackets to hold the cables in place. Each downcomer 32 is in the form of a channel having side flanges 35 and 36 interconnected by a flat central web 37. Spaced openings 38 are provided in the central web 37 for receiving fasteners, such as screws 39, which secure the downcomer 32 to a structure such as a bulkhead or wall 40. The downcomer 32 is attached so that the outer edges of the flanges 35 and 36 engage the structure 40 and the web 37 faces outwardly. The openings 38 are elongated longitudinally of the channel to allow for misalignment of the openings in the bulkhead 40 for the screws 39.

At regularly spaced locations along the downcomer 32 are sets of tabs 42 and 43 which extend from the central web 37 on the side opposite the flanges 35 and 36. The tabs 42 and 43 which face in opposite directions, are integral with the web 37, being formed by severing the web 37 and bending the tabs outwardly, which results in openings 44 and 45 beneath the tabs.

The tabs 43 face upwardly and are smaller both laterally and longitudinally than are the tabs 42. The outer parts 46 of the tabs 43, which have rounded upper edges, overlap and are generally parallel to the plane of the web 37, although they incline away from the surface of the web at a very shallow angle. The inner parts 47 of the tabs 43, at their lower ends, incline to their connections with the web 37.

Each of the downwardly facing upper tabs 42 includes an outer central portion 48 which is rounded transversely so as to be convex when viewed from the outside and which extends in a direction substantially parallel to the central web 37. An inclined inner portion 49 extends from the portion 48 to the web 37. The side portions of the tab 42 include inclined inner parts 50 and 51 extending from the web 37 on either side of the portion 49, connecting to parts 52 and 53 that are substantially parallel to the web 37. The latter side parts are closer to the web 37 than the central convex part 48 between them. From there, the side parts 54 and 55 incline outwardly away from the web 37 to substantially the end of the central convex part 48. At the distal end of each tab 42, beyond the convex portion 48, is a relatively narrow flat projection 56 which has a rounded lower edge 57. The projection 56 inclines inwardly toward the central web 37 at a very shallow angle.

Each set of tabs 42 and 43 may retain a bracket 9, or only certain sets may be selected to suit existing conditions. The brackets are attached in the sequence of steps illustrated in FIGS. 6, 7 and 8. The parts are proportioned so that the side flanges 18 and 19 of the bracket 9 can receive the side flanges 35 and 36 of the downcomer 32. The tab 42 is spaced outwardly from the central web 37 a distance greater than the wall thickness of the bracket 9. This enables the flat intermediate portion 20 of the section 10 of the bracket to be inserted beneath the tab 42, in the manner shown in FIG. 6. The upper edge 58 of the intermediate portion 20 then engages the central web 37 of the downcomer 32 and the horizontal portion 11 of the bracket is inclined upwardly. The intermediate portion 20 of the vertical part 10 of the bracket 9, between its upper edge 58 and its lower edge 59 at the opening 22, is just slightly shorter than the spacing between the upper end 46 of the tab 43 and the inclined side parts 50 and 51 of the tab 42 at the web 37. As a result, it is possible to rotate the bracket 9 counterclockwise from the position of FIG. 6, clearing the lower tab 43, to bring the bracket section 20 to bear against the central web 37. After this, the bracket 9 is slid downwardly to the position of FIG. 7. This brings the lower edge 59 of the intermediate section 20 of the upper portion 10 behind the lower tab 43, which is closer to the web 37 than the tab 42, where it fits snugly.

The attachment of the bracket 9 is completed by bending the lower end portion 56 of the tab 42 inwardly, as indicated in FIG. 8, which is accomplished easily by a blow from a hammer. When the tab 42 is struck, the end portion 56 is bent inwardly to enter the opening 31 in the intermediate part 20 of the vertical portion 10 of the bracket. The end portion 56 then inclines more steeply toward the web 37 and its rounded lower edge 57 is located very close to the periphery of the opening 31 at the lower part of this opening. Also, the side portions 52 and 53 of the tab 42 then are brought down on the flat portion 20 of the bracket 9 adjacent the upper edge 58 of the bracket. This holds the bracket 9 securely to the downcomer 32.

The lower edge portion 57 of the end 56 of the tab 42 acts as a downwardly facing abutment and the lower periphery of the opening 31 forms an upwardly facing abutment that cooperate to prevent upward movement of the bracket 9 relative to the downcomer 32. Downward bracket movement is precluded by the lower tab 43, engaged by the lower edge portion 59 of the flat portion 20 of the vertical part 10 of the bracket 9. Rotation of the bracket is precluded by its side flanges 18 and 19 that fit snugly over the sides of the downcomer 32.

The attachment is very secure, particularly in view of the strength of the upper tab 42. This tab is relatively wide, being the full width of the central web 37 intermediate the side flanges 35 and 36 at its point of attachment. The outwardly convex central parts 48 and 49 provide the tab 42 with the configuration of a longitudinal rib, substantially adding to its rigidity. This is important because the tab 42 must withstand the principal loads imposed upon the bracket 9. Loads on the horizontal section 11 tend to cause the bracket 9 to pivot relative to the downcomer 32 about the edge 59 of the vertical portion 10. The relatively long horizontal section 11 provides a mechanical advantage such that the load is magnified where the upper edge 58 of the vertical part 10 of the bracket 9 engages the tab 42. Nevertheless, the tab 42 is sufficiently strong to withstand very high loading on the bracket 9.

Although the tab 42 has rigidity, its lower end portion 56 is beyond the rib and narrower than the remaining portions of the tab, and so is relatively bendable. This facilitates bending the tab end into the opening 32 to hold the bracket in place.

Not only is the bracket 9 very rapidly and easily attached to the downcomer 32, but the connection will not loosen in service from vibrational loads or any other forces applied, there being no threads in the assembly. Generally speaking, once the brackets 9 have been attached there is no need to remove them. However, it is possible to do so, if desired, by prying outwardly on the tab 42 to enable the bracket 9 to be removed in the reverse of the procedure illustrated in FIGS. 6, 7 and 8.

Instead of a channel, a square tube may be used as the bracket support, with the tabs projecting outwardly from the face of the tube.

The foregoing detailed description is to be clearly understood as given by way of illustration and example only, the spirit and scope of this invention being limited solely by the appended claims.

We claim:

1. In combination with a bracket having a part adapted for connection to a support, said part including an upper edge, a lower edge, and means defining an upwardly facing abutment surface intermediate said edges and facing towards said upper edge, said upper edge, lower edge and abutment being spaced fixed distances from each other, a support for said bracket comprising
   a member having a surface, and opposed tabs outwardly of said surface,
      the first of said tabs overlapping said part of said bracket upwardly of said lower edge thereof,
      the second of said tabs overlapping said part of said bracket downwardly of said upper edge,
         said second tab having a portion in juxtaposition with said upwardly facing abutment surface for retaining said bracket against upward movement.

2. A device as recited in claim 1 in which said second tab includes a longitudinally extending rib for increasing the strength of said second tab.

3. A device as recited in claim 2 in which said second tab includes side portions alongside said longitudinally extending rib, said side portions being adjacent the upper edge portion of said part of said bracket for preventing outward movement of said upper edge portion.

4. In combination with a bracket having a part adapted for connection to a support, said part including an upper edge, a lower edge, and means defining an upwardly facing abutment intermediate said edges, a support for said bracket comprising
   a member having a surface, and opposed tabs outwardly of said surface,
      the first of said tabs overlapping said part of said bracket upwardly of said lower edge thereof,
      the second of said tabs overlapping said part of said bracket downwardly of said upper edge,
         said second tab having a portion adjacent said upwardly facing abutment for retaining said bracket against upward movement, said portion of said second tab being narrower than the remaining portions of said second tab.

5. In combination with a bracket having a part adapted for connection to a support, said part including an upper edge, a lower edge, and means provided by an opening in said part of said bracket defining an upwardly facing abutment intermediate said edges, a support for said bracket comprising
   a member having a surface, and opposed tabs outwardly of said surface,
      the first of said tabs overlapping said part of said bracket upwardly of said lower edge thereof,
      the second of said tabs overlapping said part of said bracket downwardly of said upper edge,
         said second tab having a portion adjacent said upwardly facing abutment for retaining said bracket against upward movement, said portion of said second tab being at the end thereof and bent into said opening.

6. A device as recited in claim 5 in which said second tab includes a longitudinally extending rib for increasing the strength of said second tab, and said longitudinally extending rib stops short of said portion of said second tab for facilitating the bending of said portion into said opening.

7. A device as recited in claim 6 in which said longitudinally extending rib is curved transversely and is convex from the exterior thereof.

8. A device as recited in claim 7 in which said surface of said member is substantially flat, and said member includes substantially parallel additional surfaces extending away from said first mentioned surface on the side thereof remote from said tabs, said bracket having portions overlapping said additional surfaces for stabilizing said bracket relative to said member.

9. A device as recited in claim 8 in which said member is a channel.

10. A device as recited in claim 8 in which said member includes a plurality of sets of said opposed tabs.

11. A device as recited in claim 10 in which said member includes openings through said surface intermediate said sets of said opposed tabs for receiving fastener means used in attaching said member to a structural element.

12. A supporting device for holding a bracket comprising an elongated member having a substantially flat surface, and a duality of spaced opposed tabs extending outwardly from said substantially flat surface, each of said tabs including an outer portion overlapping the plane of said substantially flat surface, one of said tabs including a distal end and a bendable portion at said distal end adapted to be bent into an opening in a bracket associated therewith, said bendable portion being narrower than the width of said one tab inwardly of said distal end, said bendable portion being spaced farther from said substantially flat surface than is the other of said tabs.

13. A device as recited in claim 12 in which said one tab includes a rib inwardly of said one end for increasing the strength thereof.

14. A device as recited in claim 13 in which said one tab has side portions alongside said rib, said side portions being closer to the plane of said surface than said rib.

15. A supporting device for holding a bracket comprising an elongated member having a substantially flat surface, and a duality of spaced opposed tabs extending outwardly from said substantially flat surface, each of said tabs including an outer portion overlapping the plane of said substantially flat surface, one of said tabs including a distal end and a bendable portion at said distal end adapted to be bent into an opening in a bracket associated therewith, said bendable portion being narrower than the width of said one tab inwardly of said distal end, said distal end inclining inwardly toward said plane of said surface at a shallow angle.

16. A supporting device for holding a bracket comprising an elongated member having a substantially flat surface, and a duality of spaced opposed tabs extending outwardly from said substantially flat surface, each of said tabs including an outer portion overlapping the plane of said substantially flat surface, one of said tabs including a distal end and a bendable portion at said distal end adapted to be bent into an opening in a bracket associated therewith, said bendable portion being narrower than the width of said one tab inwardly of said distal end, said outer portion of the other of said tabs inclining away from said plane of said surface at a shallow angle.

17. A supporting device for holding a bracket comprising an elongated member having a substantially flat surface, and a duality of spaced opposed tabs integral with said member extending outwardly from said substantially flat surface, each of said tabs including an outer portion overlapping the plane of said substantially flat surface, one of said tabs including a distal end and a bendable portion at said distal end adapted to be bent into an opening in a bracket associated therewith, said bendable portion being narrower than the width of said one tab inwardly of said distal end.

* * * * *